United States Patent
Fukuoka et al.

(10) Patent No.: US 10,669,976 B2
(45) Date of Patent: Jun. 2, 2020

(54) FUEL SUPPLY DEVICE

(71) Applicant: DENSO CORPORATION, Kariya, Aichi-pref. (JP)

(72) Inventors: Shingo Fukuoka, Kariya (JP); Norihiro Hayashi, Kariya (JP); Tetsuro Okazono, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 16/077,553

(22) PCT Filed: Feb. 24, 2017

(86) PCT No.: PCT/JP2017/006970
§ 371 (c)(1),
(2) Date: Aug. 13, 2018

(87) PCT Pub. No.: WO2017/163752
PCT Pub. Date: Sep. 28, 2017

(65) Prior Publication Data
US 2019/0032614 A1    Jan. 31, 2019

(30) Foreign Application Priority Data
Mar. 24, 2016 (JP) .................... 2016-060294

(51) Int. Cl.
*F02M 37/10* (2006.01)
*B60K 15/03* (2006.01)
(Continued)

(52) U.S. Cl.
CPC ........... *F02M 37/106* (2013.01); *B60K 15/03* (2013.01); *F02M 37/0082* (2013.01);
(Continued)

(58) Field of Classification Search
CPC .... F02M 37/106; F02M 37/103; F02M 37/10; F02M 37/0082; F02M 37/20;
(Continued)

(56) References Cited

U.S. PATENT DOCUMENTS 6,000,913 A * 12/1999 Chung ................. B60K 15/077
123/509
6,014,957 A * 1/2000 Robinson ............... F02M 37/10
123/509

(Continued)

FOREIGN PATENT DOCUMENTS

| JP | 2012-067736 | 4/2012 |
|----|-------------|--------|
| JP | 2012-184760 | 9/2012 |
| JP | 2015-232332 | 12/2015 |

*Primary Examiner* — Mahmoud Gimie
(74) *Attorney, Agent, or Firm* — Nixon & Vanderhye PC

(57) ABSTRACT

A fuel supply device includes: a cover attached to an upper wall of a fuel tank; a pump unit disposed on a bottom wall of the fuel tank; and a connecting strut that connects the cover and the pump unit with each other. The pump unit includes: a unit body supported by the connecting strut in a radial direction and a thrust direction, and a fuel pump arranged on the unit body to pump fuel drawn from the fuel tank toward an internal-combustion engine. The fuel pump is located offset toward the connecting strut from a width center of a width from a thrust support part where the unit body is supported by the connecting strut to an end part of the unit body opposite from the connecting strut in a specific transverse direction.

6 Claims, 13 Drawing Sheets

(51) Int. Cl.
*F02M 37/00* (2006.01)
*F02M 37/20* (2006.01)

(52) U.S. Cl.
CPC ..... *F02M 37/20* (2013.01); *B60K 2015/0325* (2013.01); *B60K 2015/03138* (2013.01); *B60K 2015/03243* (2013.01)

(58) Field of Classification Search
CPC .......... B60K 15/03; B60K 2015/03138; B60K 2015/032443; B60K 2015/0325
USPC ....................................................... 123/509
See application file for complete search history.

(56) References Cited

U.S. PATENT DOCUMENTS

| | | | |
|---|---|---|---|
| 6,230,690 B1 * | 5/2001 | Umetsu | B60K 15/077 123/509 |
| 6,716,000 B2 * | 4/2004 | Appleton | F02M 37/103 123/509 |
| 2005/0189020 A1 * | 9/2005 | Okabe | F02M 37/025 137/565.22 |
| 2007/0259745 A1 | 11/2007 | Painta et al. | |
| 2017/0268471 A1 | 9/2017 | Fukui et al. | |

* cited by examiner

FUEL SUPPLY DEVICE

CROSS REFERENCE TO RELATED APPLICATION

This application is the U.S. national phase of International Application No. PCT/JP2017/006970 filed Feb. 24, 2017, and claims priority to Japanese Patent Application No. 2016-60294 filed on Mar. 24, 2016, the entire contents of each of which are incorporated herein by reference.

TECHNICAL FIELD

The present disclosure relates to a fuel supply device that supplies fuel to an internal-combustion engine from a fuel tank for a vehicle.

BACKGROUND ART

Conventionally, an in-tank fuel supply device arranged in a fuel tank is widely applied to an internal-combustion engine of a vehicle.

Patent Literature 1 describes a kind of such a fuel supply device, in which a cover is attached to an upper wall of a fuel tank, and a pump unit is laid on a bottom wall of the fuel tank to pump fuel from the fuel tank to an internal-combustion engine. The cover and the pump unit are connected with each other by a connecting strut. The pump unit has a unit body supported by the connecting strut in a radial direction and a thrust direction, and a fuel pump arranged on the unit body. The pumping performance can be stable, since the fuel pump positioned in the fuel tank draws fuel from the fuel tank and sends the fuel towards the internal-combustion engine.

PRIOR ART LITERATURES

Patent Literature

Patent Literature 1: JP 2012-184760 A

SUMMARY OF INVENTION

In Patent Literature 1, the fuel pump is comparatively heavy among the components of the pump unit, and receives a big force of inertia when the vehicle turns, accelerates or decelerates. At this time, the position of the unit body supported by the connecting strut in the thrust direction functions as a fulcrum, and the position of the unit body supported by the connecting strut in the radial direction functions as a point of load, provided that the center of gravity of the fuel pump is a point to which the force of inertia is applied. Therefore, if the force of inertia becomes large at the point of effort, a moment increases at the radial support part as the point of load. Therefore, there is a possibility of causing breakage in the radial support part, while Patent Literature 1 is silent about measures to the breakage.

It is an object of the present disclosure to provide a fuel supply device in which a breakage is restricted.

According to an aspect of the present disclosure, a fuel supply device that supplies fuel to an internal-combustion engine from a fuel tank for a vehicle, the fuel supply device including:

a cover to be attached to an upper wall of the fuel tank;

a pump unit to be disposed on a bottom wall of the fuel tank to pump the fuel from the fuel tank toward the internal-combustion engine; and a connecting strut that connects the cover and the pump unit with each other.

The pump unit includes: a unit body supported by the connecting strut in a radial direction and a thrust direction; and a fuel pump arranged on the unit body to pump fuel drawn from the fuel tank toward the internal-combustion engine. The fuel pump is located offset toward the connecting strut from a width center of a width of the unit body from a thrust support part where the unit body is supported by the connecting strut to an end part of the unit body opposite from the connecting strut in a specific transverse direction.

Thus, the fuel pump is located offset toward the connecting strut from the width center of the width of the unit body in the specific transverse direction. The width is defined from the thrust support part where the unit body is supported by the connecting strut to the end part of the unit body opposite from the connecting strut in the specific transverse direction. Therefore, the center of gravity of the fuel pump can be located close to the thrust support part, while the force of inertia is applied to the center of gravity when the vehicle turns, accelerates or decelerates. Even if the force of inertia becomes large at the center of gravity that serves as the point of effort in case where the thrust support part works as a fulcrum, a moment can be restricted from increasing. Thus, a moment can be restricted from increasing at the radial support part where the unit body is radially supported by the connecting strut, as a point of load, such that it becomes possible to restrict a breakage.

The center line of the outer diameter of the fuel pump may be along the bottom wall and located offset toward the connecting strut from the width center of the width of the unit body in the specific transverse direction.

Thus, the center line of the outer diameter of the fuel pump is along the bottom wall of the fuel tank, and is located offset toward the connecting strut from the width center of the width of the unit body in the specific transverse direction. At this time, the center of gravity of the fuel pump can be close to the thrust support part corresponding to a fulcrum, not only in the transverse direction but also in the upright direction that corresponds to a height direction from the bottom wall. Therefore, a ratio of restricting a moment from increasing can be improved at the radial support part as a point of load, even if the force of inertia becomes large at the center of gravity of the fuel pump as a point of effort. Therefore, it becomes possible to raise the reliability of the effect restricting breakage at the radial support part.

DESCRIPTION OF EMBODIMENTS

An embodiment is described based on the drawings.

Figure 1:
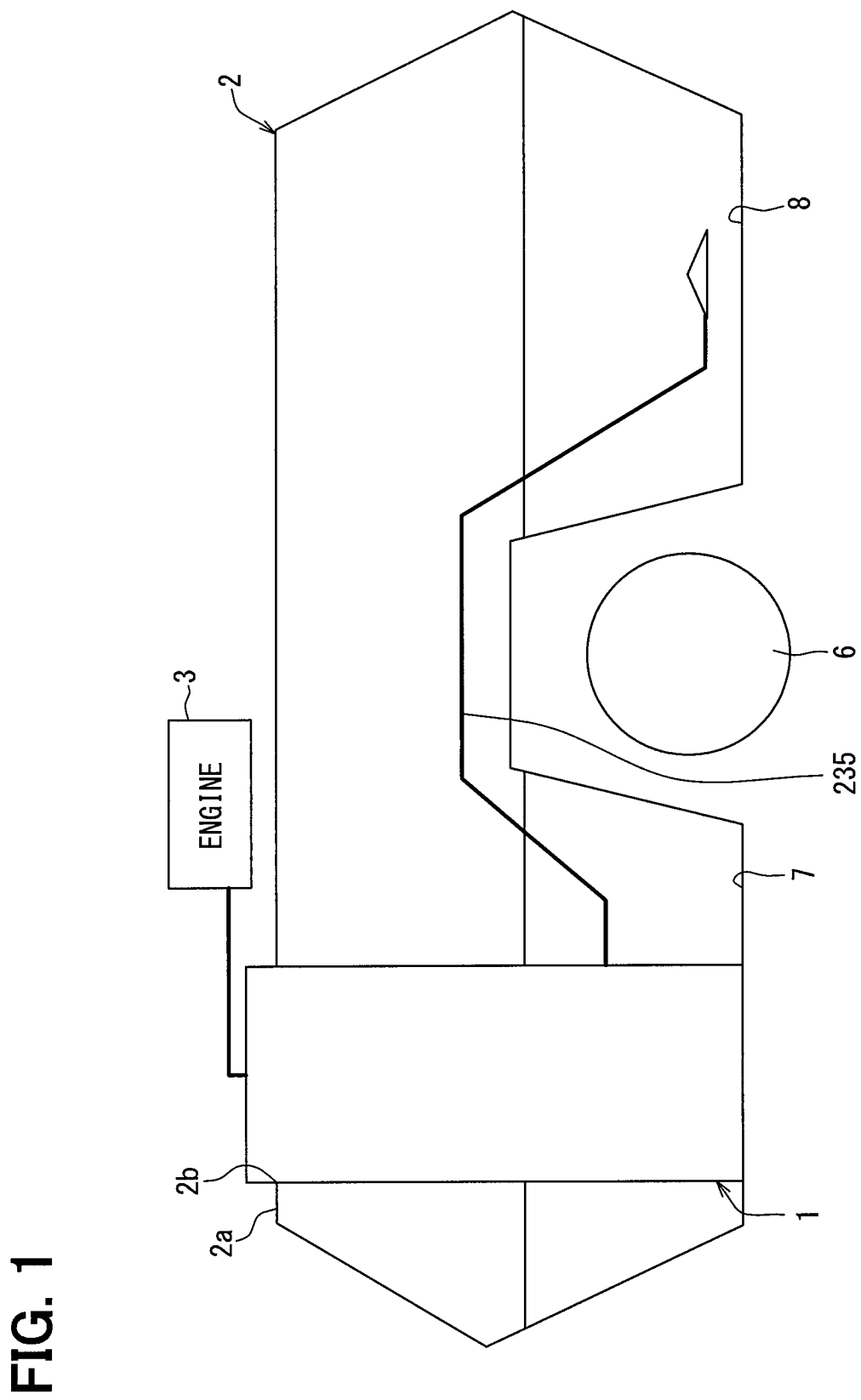
FIG. 1 is a schematic view illustrating a fuel tank in which a fuel supply device according to an embodiment is disposed.

As shown in FIG. 1, a fuel supply device 1 according to an embodiment is disposed in a fuel tank 2, for an internal-combustion engine 3 of a vehicle. The fuel supply device 1 supplies fuel stored in the fuel tank 2 to the internal combustion engine 3 of the vehicle located out of the fuel tank 2.

Figure 2:
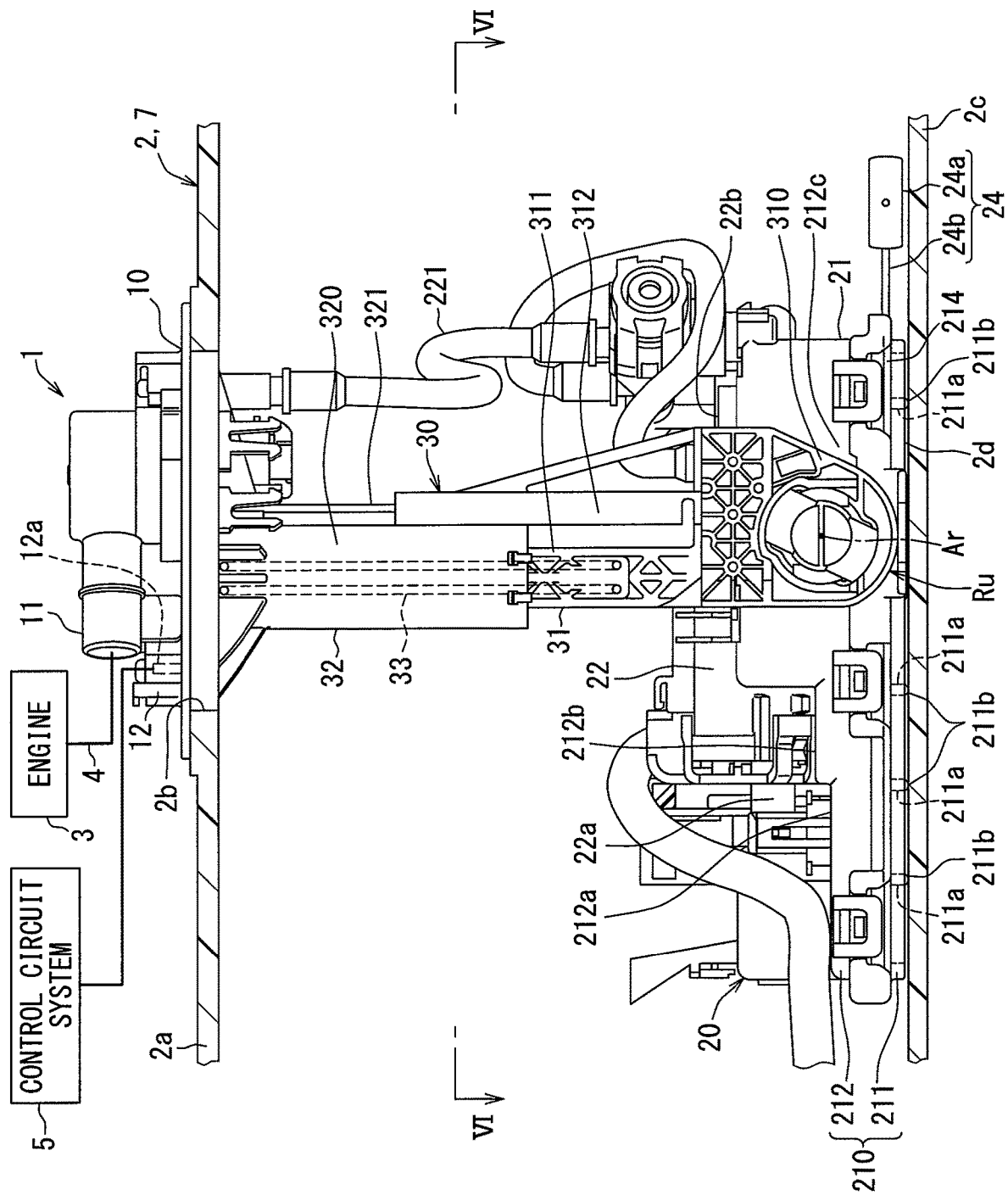
FIG. 2 is a front view illustrating the fuel supply device of the embodiment.
Figure 3:
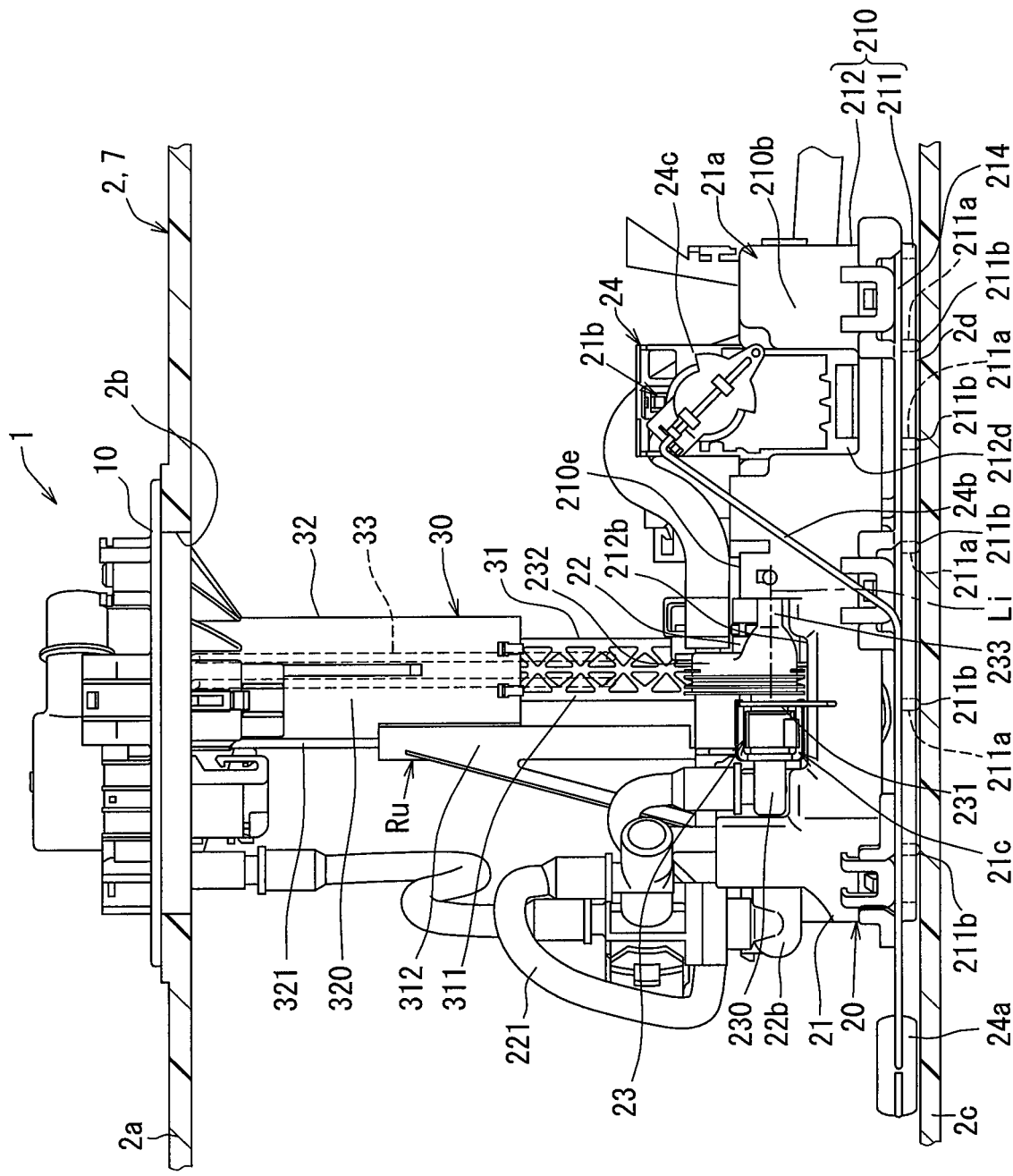
FIG. 3 is a rear view illustrating the fuel supply device of the embodiment.
Figure 4:
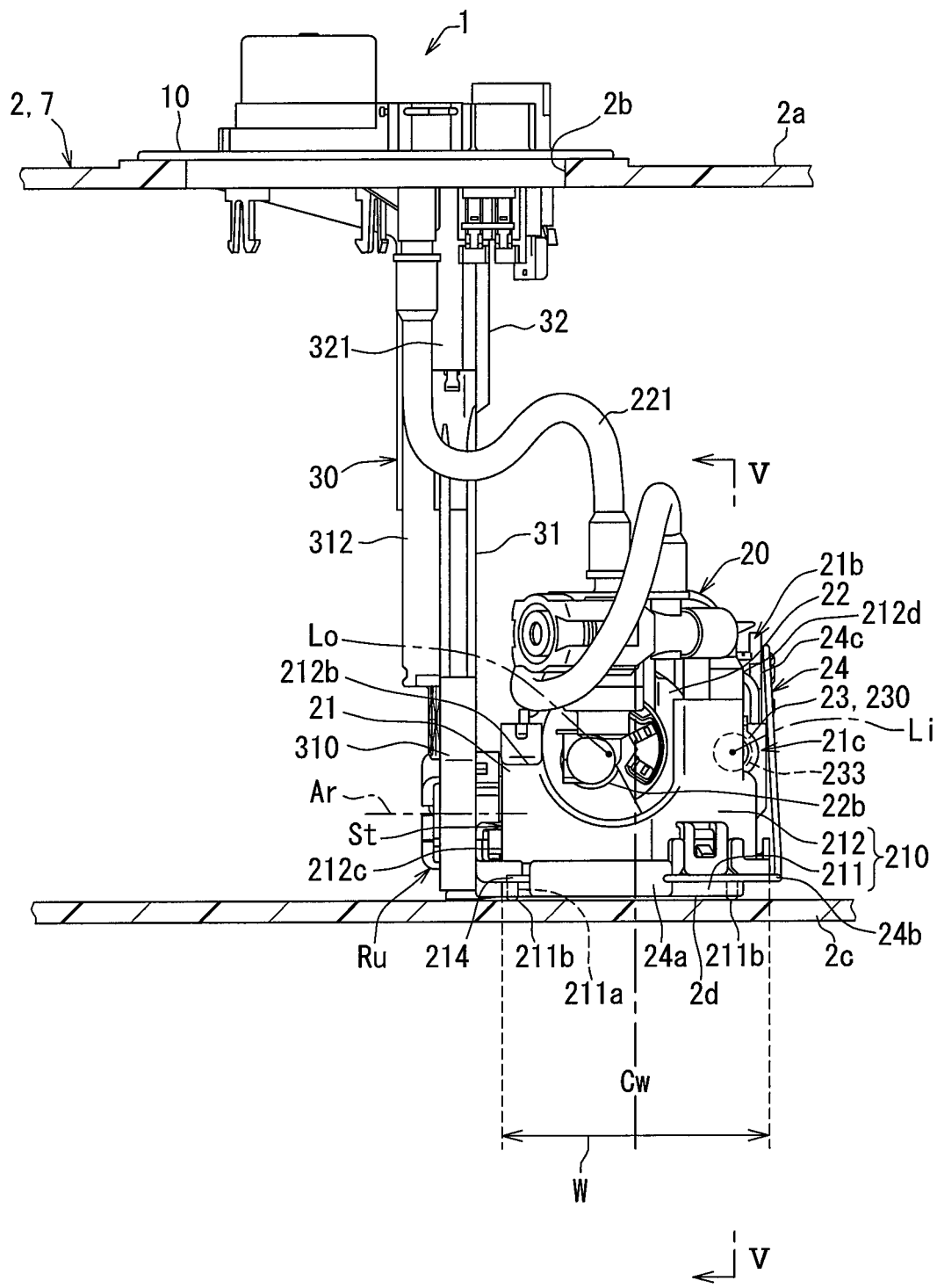
FIG. 4 is a side view illustrating the fuel supply device of the embodiment.

The fuel tank 2 is made of resin or metal, and has a hollow shape as a whole. The fuel tank 2 of this embodiment has storage parts 7 and 8 to store fuel, by forming a recess in the fuel tank, on the respective sides of a drive shaft 6 of the vehicle. As shown in FIGS. 1-4, an insertion hole 2b passes through the upper wall 2a of the fuel tank 2, in the storage part 7. The fuel supply device 1 is inserted into the storage part 7 of the fuel tank 2 through the insertion hole 2b. Under such an insertion state, the internal-combustion engine 3 to which the fuel is supplied from the fuel supply device 1 may be a gasoline engine, and may be a diesel engine. In FIGS. 2-4 illustrating the insertion state of the fuel supply device 1 in the storage part 7, the up-down direction and the left-right direction respectively correspond to a vertical direction and a transverse direction of the vehicle on a horizontal plane.

(Whole Configuration)

The whole configuration of the fuel supply device 1 is explained. As shown in FIGS. 2-4, the fuel supply device 1 includes a cover 10, a pump unit 20, and a connecting strut 30.

The cover 10 is made of resin and has the shape of a disk. The cover 10 is attached to the upper wall 2a of the storage part 7, and the cover 10 closes the insertion hole 2b. The cover 10 integrally has a fueling pipe 11 and an electric connector 12. As shown in FIG. 2, the fueling pipe 11 communicates with the pump unit 20 in the storage part 7. Out of the fuel tank 2, the fueling pipe 11 communicates with a fuel course 4 continuing to the internal-combustion engine 3. When the pump unit 20 pumps fuel from the fuel tank 2 to the internal-combustion engine 3 outside the fuel tank 2, the pumped fuel is supplied from the fueling pipe 11 to the internal-combustion engine 3 through the fuel course 4.

The electric connector 12 includes plural metal terminals 12a. Each metal terminal 12a is electrically connected with the fuel pump 22 or a surface detection unit 24 of the pump unit 20, in the storage part 7. Out of the fuel tank 2, each metal terminal 12a is electrically connected with a control circuit system 5 such as ECU. The fuel pump 22 is controlled by a control signal sent through the metal terminal 12a from the control circuit system 5. The control circuit system 5 obtains the surface height of fuel in the storage part 7 based on the detection signal sent through the metal terminal 12a from the surface detection unit 24.

As shown in FIGS. 2-4, the pump unit 20 is housed in the storage part 7, under the cover 10. The pump unit 20 has a unit body 21, the fuel pump 22, a jet pump 23, and the surface detection unit 24. The unit body 21 has the shape of a rectangle box that is flat as a whole. The unit body 21 is laid on the bottom wall 2c of the storage part 7. A subtank 210 and a filter screen 214 are disposed in the unit body 21.

As shown in FIGS. 2-5, the subtank 210 includes a lower component 211 and an upper component 212. The lower component 211 is formed with resin and has the shape of a plate. Plural inflow holes 211a pass through the lower component 211 in the up-down direction. Plural protrusion parts 211b protrude from the lower component 211 downward. Each protrusion part 211b is in contact with the bottom wall 2c of the storage part 7 from the upper side, and secures an inflow clearance 2d between the lower component 211 and the bottom wall 2c. The fuel in the storage part 7 flows into each inflow hole 211a through the inflow clearance 2d.

Figure 5:
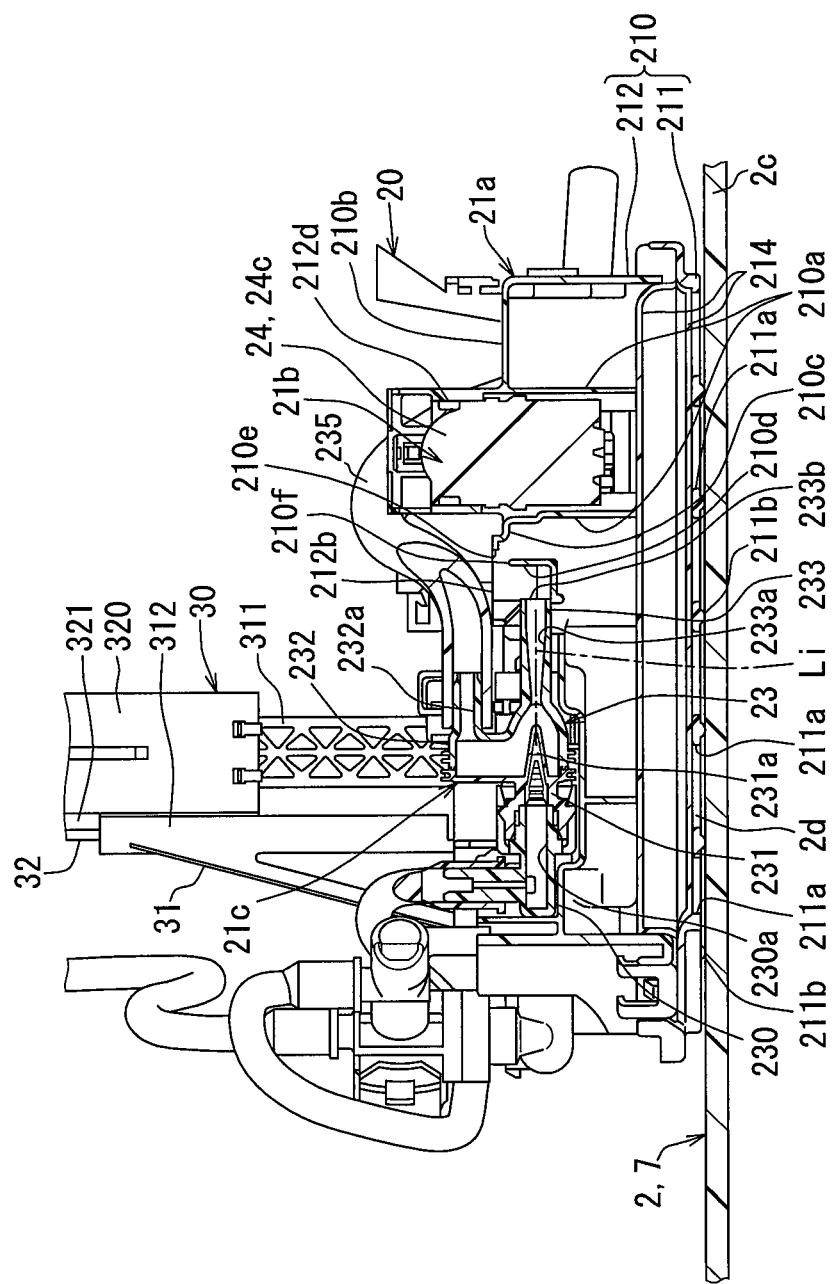
FIG. 5 is a cross-sectional view illustrating the fuel supply device of the embodiment, taken along a line V-V of FIG. 4.
Figure 6:
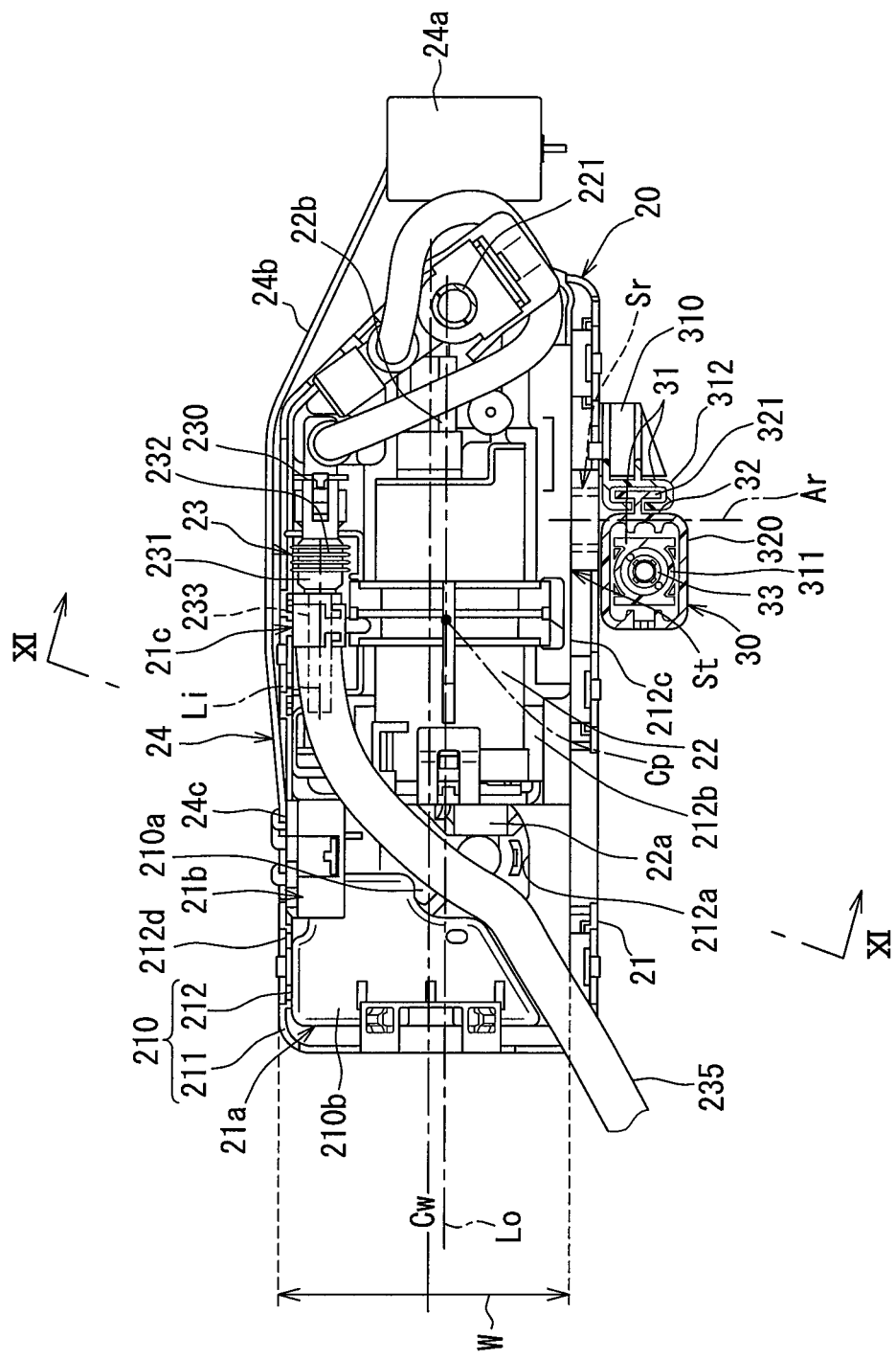
FIG. 6 is a cross-sectional view illustrating the fuel supply device of the embodiment, taken along a line VI-VI of FIG. 2.

The upper component 212 is formed with resin and has the shape of a reverse cup. As shown in FIGS. 5 and 6, the outer end part of the upper component 212 is fixed to the outer end part of the lower component 211, thereby forming the inner space 210a of the subtank 210 together with the lower component 211. A penetration hole 212a is formed to penetrate the upper component 212 in the up-down direction. The fuel in the storage part 7 flows into the upper component 212 through the penetration hole 212a, and is stored by the inner space 210a of the subtank 210.

As shown in FIGS. 2-5 and 11, the filter screen 214 is formed of a filtering material, such as porosity resin, textiles, nonwoven fabric, resin mesh, or metal mesh. The filter screen 214 has the shape of a flat rectangle bag, and the outer end part of the filter screen 214 is supported between the lower component 211 and the upper component 212. The filter screen 214 filters the fuel flowing into each inflow hole 211a and the upper component 212 from the storage part 7. The fuel filtered by the filter screen 214 is drawn by the fuel pump 22.

As shown in FIGS. 2-4 and 6, the fuel pump 22 is an electric pump such as a vane pump or a trochoid pump. The fuel pump 22 has the shape of a pillar extending in the transverse direction. The fuel pump 22 is held by the upper part 212b of the upper component 212 of the unit body 21. The fuel pump 22 is electrically connected with the metal terminal 12a through a flexible wiring which can be curved freely. An inlet port 22a of the fuel pump 22 is inserted into the upper component 212 through the penetration hole 212a, and is communicated with the filter screen 214. An outlet port 22b of the fuel pump 22 is communicated with the fueling pipe 11 through a flexible tube 221 which can be curved freely. The fuel pump 22 is driven by the control signal from the control circuit system 5, and draws the fuel filtered by the filter screen 214. The fuel pump 22 discharges the fuel toward the internal-combustion engine 3.

As shown in FIGS. 3-6, the jet pump 23 is formed by combining three resin components, and has a hollow shape as a whole. The jet pump 23 is held by the upper part 212b of the upper component 212 of the unit body 21. The jet pump 23 has an introductory part 230, an ejecting part 231, a drawing part 232, and a throat part 233.

As shown in FIG. 5, the introductory part 230 forms a pressurization passage 230a shaped in a cylindrical hole extended in the transverse direction. A part of the pressurization fuel flowing out of the outlet port 22b with the operation of the fuel pump 22 is directly introduced into the pressurization passage 230a, or indirectly e.g., through a pressure regulator, introduced into the pressurization passage 230a.

The ejecting part 231 forms a nozzle passage 231a shaped in a cone hole extended from the pressurization passage 230a in the transverse direction. The passage area of the nozzle passage 231a is reduced, as separating from the pressurization passage 230a. The nozzle passage 231a ejects the pressurization fuel introduced to the pressurization passage 230a.

The drawing part 232 forms a communicate passage 232a defined by an L-shaped hole bent from the transverse direction to the up-down direction. The communicate passage 232a is communicated with the other storage part 8 shown in FIG. 1 in which the fuel supply device 1 is not inserted in the fuel tank 2, through a flexible tube 235, shown in FIG. 5, that can be curved freely. A minimum diameter part of the nozzle passage 231a is open in the communicate passage 232a. When the pressurization fuel is ejected from the nozzle passage 231a with the operation of the fuel pump 22, a negative pressure occurs in the communicate passage 232a to draw in the fuel from the storage part 8.

The throat part 233 forms a diffuser passage 233a shaped in a cone hole extended from the communicate passage 232a in the transverse direction. The passage area of the diffuser passage 233a is increased, as separating from the communicate passage 232a. An exit 233b of the diffuser passage 233a, which is a maximum diameter part, is communicated with the inner space 210a of the subtank 210. The diffuser passage 233a pumps the fuel in the communicate passage 232a in response to the diffusing action. As a result, the fuel is pumped from the communicate passage 232a into the inner space 210a through the diffuser passage 233a.

The surface detection unit 24 shown in FIGS. 2-6 is what is called a sender gauge having a resin float 24a and a metal arm 24b in this embodiment. A detection body 24c of the surface detection unit 24 is held by the side part 212d of the upper component 212 of the unit body 21. Further, the detection body 24c of the surface detection unit 24 is electrically connected with the metal terminal 12a through a flexible wiring which can be curved freely. In the surface detection unit 24, the metal arm 24b is rotated by the resin float 24a which floats in the fuel in the storage part 7 to move up and down. The rotational position of the metal arm 24b corresponds to the surface height of fuel in the storage part 7. The detection body 24c detects the surface height corresponding to the rotational position of the metal arm 24b, and the surface detection unit 24 outputs the detection signal representing the result of the detection to the control circuit system 5 from the detection body 24c.

Figure 7:
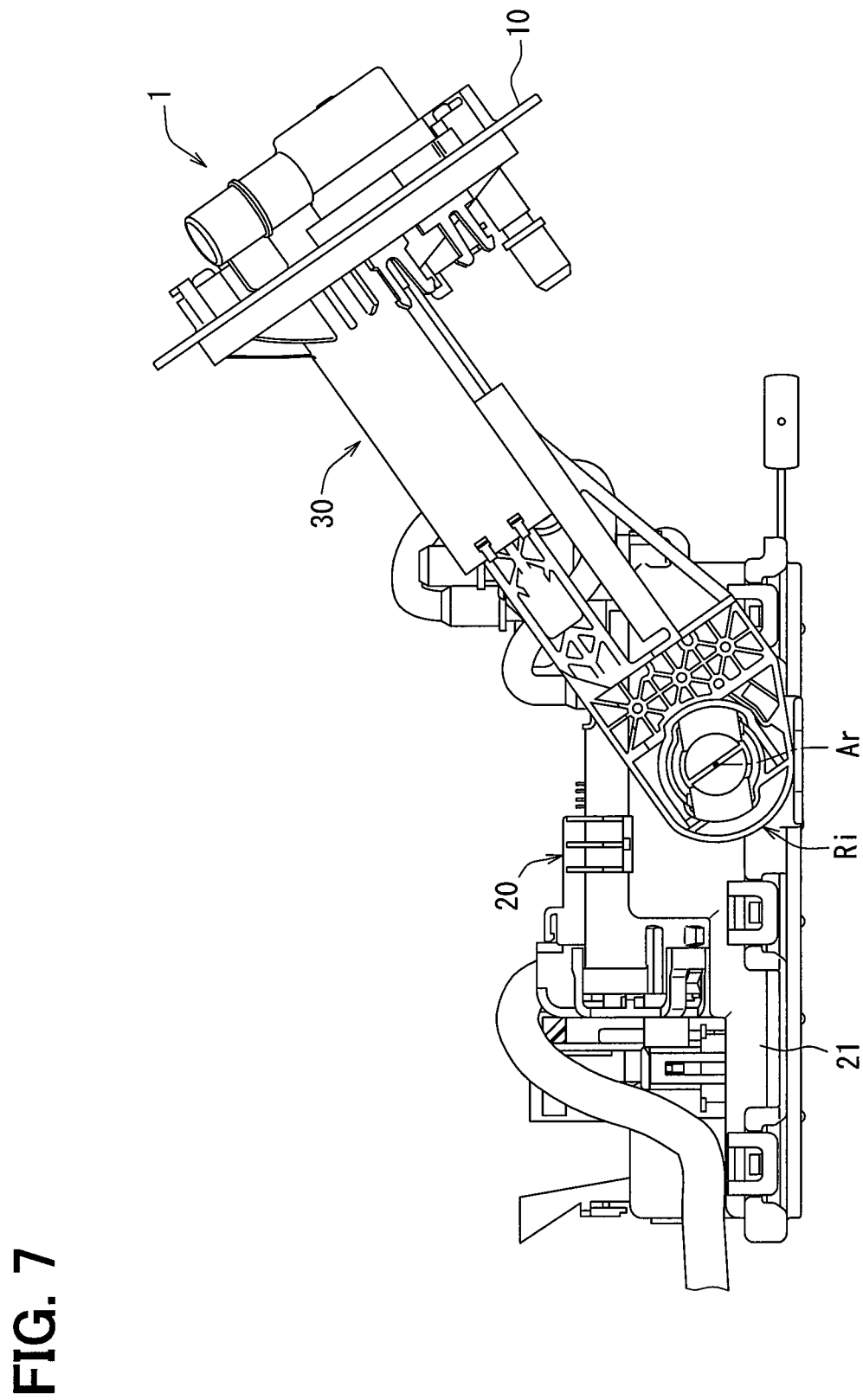
FIG. 7 is a front view illustrating a state different from FIG. 1, of the fuel supply device of the embodiment.
Figure 8:
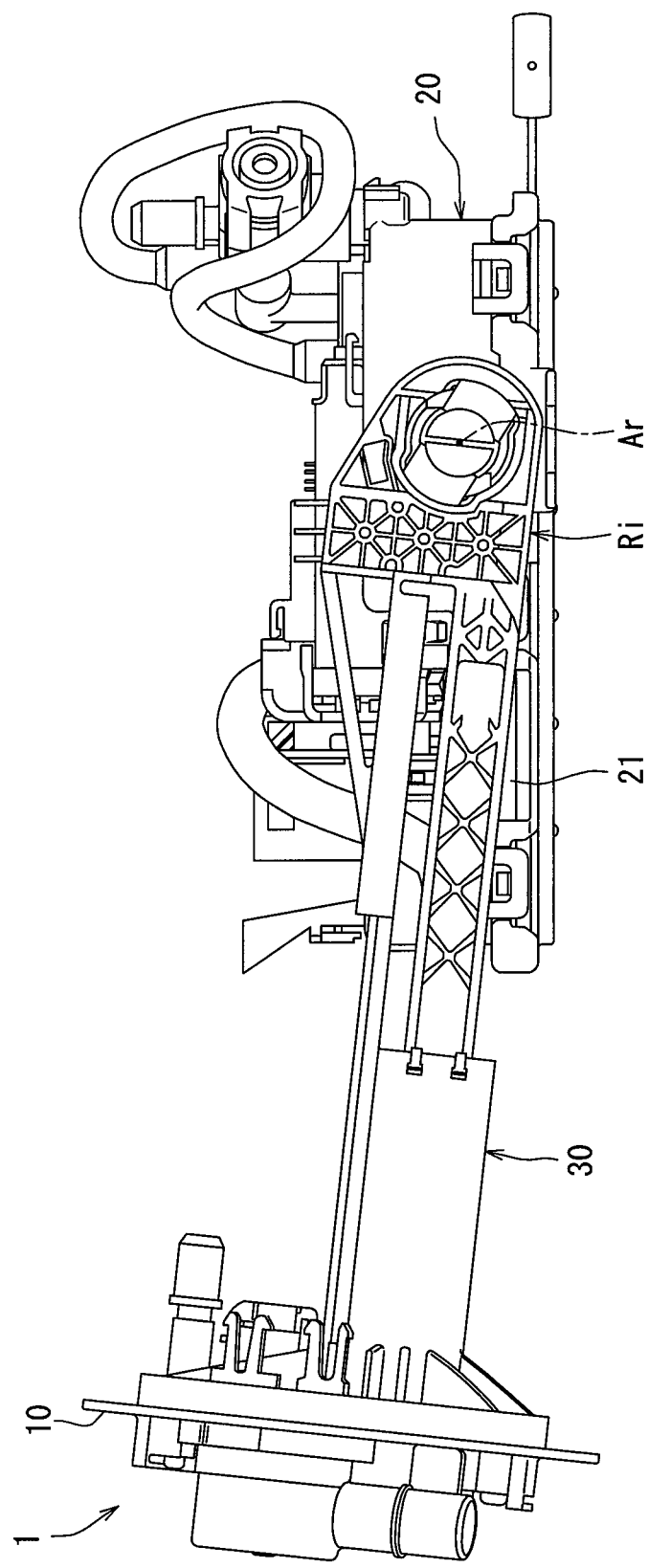
FIG. 8 is a front view illustrating a state different from FIGS. 1 and 7, of the fuel supply device of the embodiment.

As shown in FIGS. 2-4, the connecting strut 30 is housed in the storage part 7. As shown in FIGS. 2-4, 7, and 8, the connecting strut 30 solely connects the cover 10 and the pump unit 20 with each other as a whole. The pump unit 20 is mounted to the sole connecting strut 30 to be rotatable around the rotation axis Ar that is parallel with the transverse direction. A use state position Ru shown in FIGS. 2-4 and an insertion state position Ri shown in FIGS. 7 and 8 are specified for the pump unit 20, as a rotational position around the rotation axis Ar relative to the connecting strut 30.

Specifically, as shown in FIGS. 2-4, the use state position Ru is a rotational position where the unit body 21 is laid on the bottom wall 2c to be approximately perpendicular to the connecting strut 30 that is extended in the up-down direction as a whole, after the fuel supply device 1 is inserted in the storage part 7. The insertion state position Ri is another rotational position, as shown in FIGS. 7 and 8, before the fuel supply device 1 is inserted in the storage part 7, in which the bending angle of the unit body 21 to the connecting strut 30 is smaller than that in the use state position Ru. The rotational direction is different between FIGS. 7 and 8, for rotating the unit body 21 around the rotation axis Ar. It is possible to insert the whole fuel supply device 1 into the storage part 7 through the insertion hole 2b by selecting the insertion state position Ri shown in FIG. 7 or FIG. 8 according to the specification of the fuel tank 2.

As shown in FIGS. 2-6, the connecting strut 30 has a lower support 31, an upper support 32, and an elastic component 33. The lower support 31 includes a rotation plate part 310, a lower pillar part 311, and a lower pipe part 312. The rotation plate part 310 is formed with resin, and has the shape of a plate which spreads in the up-down direction and the transverse direction. The rotation plate part 310 is mounted to the side part 212c of the upper component 212 of the unit body 21 to be rotatable around the rotation axis Ar. The lower pillar part 311 is formed with resin, and has the shape of a rectangle pillar along the up-down direction. The lower pipe part 312 is formed with resin, and has the shape of a rectangle pipe along the up-down direction.

The upper support 32 includes an upper pipe part 320 and an upper pillar part 321. The upper pipe part 320 is formed with resin, and has the shape of a rectangle pipe along the up-down direction. The upper pipe part 320 is extended downward from the cover 10. The lower pillar part 311 is slidingly fitted with the upper pipe part 320 from the lower side. The upper pillar part 321 is formed with resin, and has the shape of a rectangle pillar along the up-down direction. The upper pillar part 321 is extended downward from the cover 10. The upper pillar part 321 is slidingly fitted with the lower pipe part 312 from the upper side.

The elastic component 33 is made of metal and has the shape of a coil spring. The elastic component 33 is housed in a range over the upper pipe part 320 and the lower pillar part 311, and is supported between the upper pipe part 320 and the lower pillar part 311. The elastic component 33 applies the restoring force downward to the lower pillar part 311 under the state where the elastic component is engaged with the upper pipe part 320. Each protrusion part 211b of the unit body 21 is forced onto the bottom wall 2c by the restoring force within the storage part 7. As a result, the relative position of the lower support 31 and the upper support 32 is changed according to an expansion/contraction of the fuel tank 2, such that a breakage of the connecting strut 30 can be restricted.

(Support Structure of Unit Body by Connecting Strut)

Next, the support structure of the unit body 21 by the connecting strut 30 is explained in detail.

Figure 9:
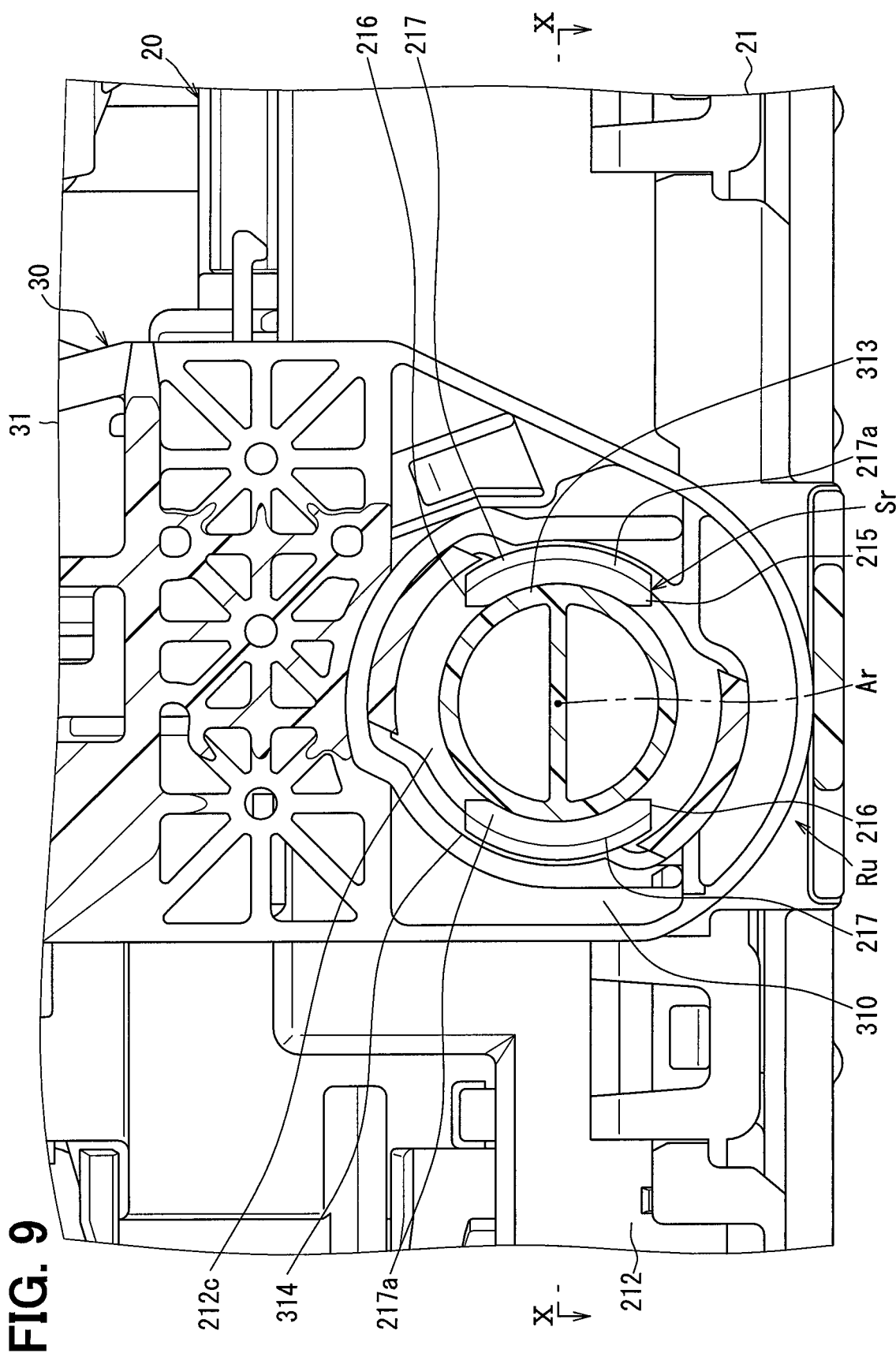
FIG. 9 is an enlarged cross-sectional view illustrating the fuel supply device of the embodiment, taken along a line IX-IX of FIG. 10.
Figure 10:
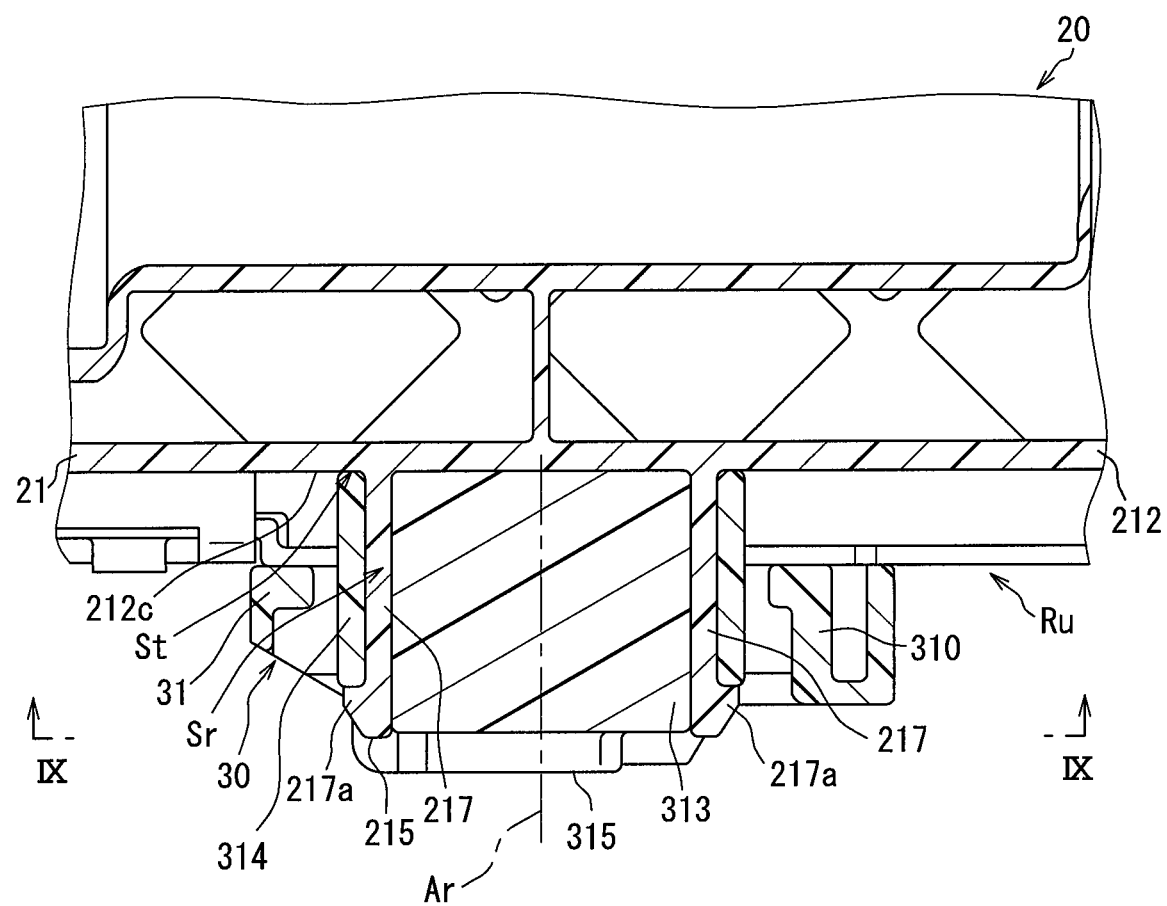
FIG. 10 is an enlarged cross-sectional view illustrating the fuel supply device of the embodiment, taken along a line X-X of FIG. 9.

As shown in FIGS. 9 and 10, the upper component 212 of the unit body 21 has a unit axis part 215. The unit axis part 215 is formed with resin, and has the shape of a cylinder extended in the transverse direction. The unit axis part 215 is projected from the side part 212c of the upper component 212, in alignment with the rotation axis Ar. The unit axis part 215 has a unit space part 216 and a unit nail part 217 alternately located in the rotational direction around the rotation axis Ar.

Specifically, the unit space part 216 is formed at two places, in the unit axis part 215, spaced from each other with a regular interval in the rotational direction. Each unit space part 216 is extended in the shape of a slit along the rotation axis Ar. The unit axis part 215 is divided by each unit space part 216 having the slit shape into a pair of unit nail parts 217 having a curved board shape. The tip end part of each unit nail part 217 forms an engaging nail 217a projected outward in the radial direction.

The lower support 31 of the connecting strut 30 has an inner circumference axis part 313 and an outer circumference axis part 314. The inner circumference axis part 313 is formed with resin, and has the shape of a cylinder extending in the transverse direction. The inner circumference axis part 313 is projected from a connection section 315 of the lower support 31 connected with the outer circumference axis part 314, in alignment with the rotation axis Ar. The outer circumference axis part 314 is formed with resin, and has the shape of a cylinder extending in the transverse direction. The outer circumference axis part 314 is projected from the rotation plate part 310 of the lower support 31, in alignment with the rotation axis Ar.

At the use state position Ru shown in FIGS. 9 and 10, each unit nail part 217 of the unit axis part 215 is supported between the axis part 313 and the axis part 314, such that the unit body 21 is supported by the connecting strut 30 in the radial direction, to define a radial support part Sr. At the use state position Ru, the axis part 313, 314 is in surface contact with the side part 212c of the upper component 212, such that the unit body 21 is supported by the connecting strut 30 in the thrust direction, to define a thrust support part St. Furthermore, at the use state position Ru, the engaging nail 217a of each unit nail part 217 is engaged with the outer circumference axis part 314 on the side opposite from the thrust support part St. Therefore, the connecting strut 30 is engaged with the unit body 21, and is regulated from separating.

(Arrangement Structure in Unit Body)

Next, the arrangement structure of components in the unit body 21 is explained in detail.

As shown in FIGS. 4 and 6, the unit body 21 is defined to have a width W in a specific transverse direction, and the width W is defined from the thrust support part St where the side part 212c is thrust-supported by the connecting strut 30, to the outer end part of the side part 212d that is a side opposite from the connecting strut 30. The width W in the transverse direction is also a lateral width along the rotation axis Ar in this embodiment.

Relative to the unit body 21, the fuel pump 22 is located offset toward the connecting strut 30 from the width center Cw of the width W of the unit body in the specific transverse direction. That is, the fuel pump 22 is located offset toward the thrust support part St. In this state, the center line Lo of the outer diameter of the fuel pump 22 extends in the transverse direction of the unit body 21, along the bottom wall of the storage part 7, and is located offset toward the connecting strut 30 than the width center Cw of the width W of the unit body 21 in the specific transverse direction. Moreover, a remaining space 21a, 21b, 21c remains around the fuel pump 22 in the unit body 21, on the side opposite from the connecting strut 30 through the width center Cw of the width W of the unit body 21 in the specific transverse direction, i.e., on the side away from the thrust support part St.

As shown in FIGS. 3, 5, and 6, the enlarging part 210b of the subtank 210 is arranged in the remaining space 21a most distant from the fuel pump 22. The enlarging part 210b is projected into the upper remaining space 21a from the upper part 212b of the upper component 212 which defines the subtank 210 of the unit body 21. Therefore, the enlarging part 210b increases the inner space 210a of the subtank 210. In this embodiment, as shown in FIG. 6, the enlarging part 210b is located not only on a side opposite from the connecting strut 30 than the width center Cw of the width W of the unit body 21 in the specific transverse direction but also on a side adjacent to the connecting strut 30 than the width center Cw of the width W of the unit body 21 in the specific transverse direction. As a whole, the enlarging part 210b is located offset to the opposite side than the adjacent side.

As shown in FIGS. 3-6, the detection body 24c of the surface detection unit 24 is arranged in the remaining space 21b adjacent to the fuel pump 22 than the remaining space 21a. The metal arm 24b is rotated on the opposite side from the connecting strut 30 through the unit body 21 in this arrangement. As a result, the connecting strut 30 is rotatable between the insertion state position Ri of FIG. 7 and the insertion state position Ri of FIG. 8 through the use state position Ru of FIG. 2 in the rotational direction.

As shown in FIGS. 3-6, the jet pump 23 is arranged in the remaining space 21c most close to the fuel pump 22. The center line Li of the inner diameter of the throat part 233 of the jet pump 23 extends in the transverse direction, along the center line Lo of the outer diameter of the fuel pump 22 and the bottom wall 2c of the storage part 7, on the opposite side opposite from the connecting strut 30 through the width center Cw of the width W of the unit body 21 in the specific transverse direction.

Figure 11:
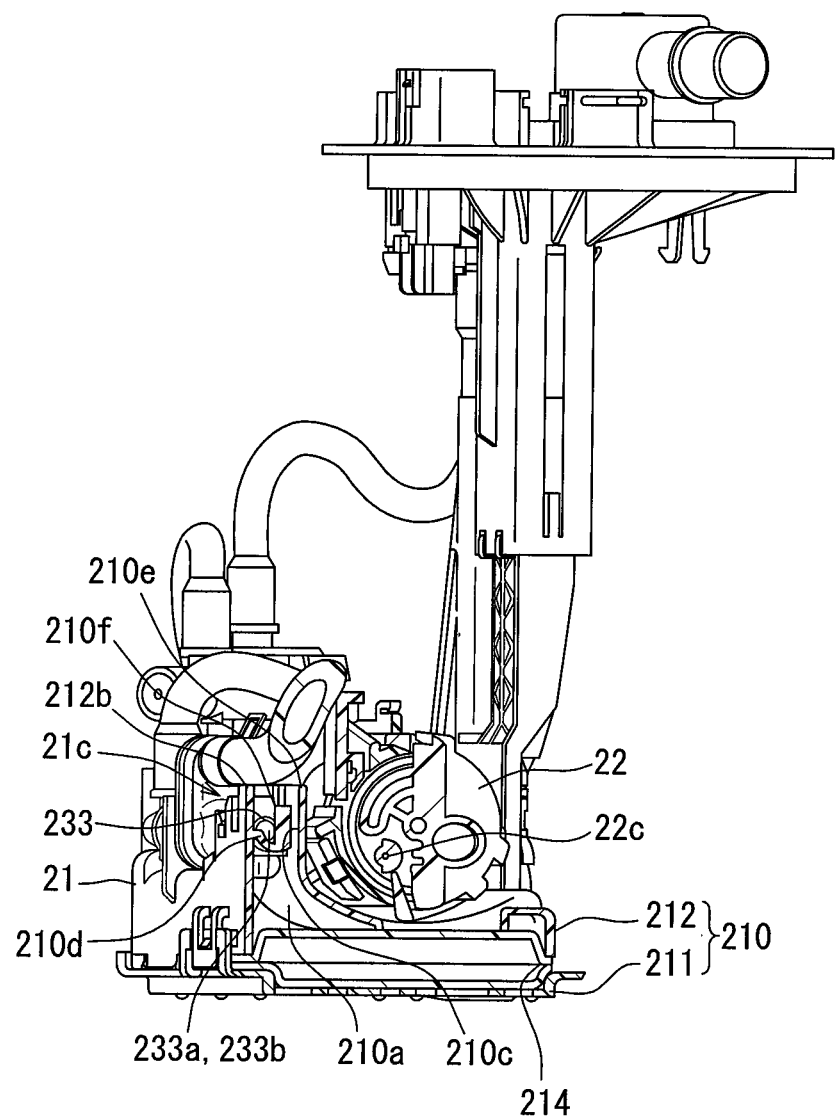
FIG. 11 is a cross-sectional view illustrating the fuel supply device of the embodiment, taken along a line XI-XI of FIG. 6.

As shown in FIGS. 5 and 11, in addition to the throat part 233, the guide part 210c and the inflow part 210d of the subtank 210 are arranged in the remaining space 21c. Each of the guide part 210c and the inflow part 210d has a hollow shape that partitions the inner space 210a, as a part of the upper component 212 which defines the subtank 210 of the unit body 21. As shown in FIGS. 5 and 11, the guide part 210c forms the open hole 210e open to the storage part 7, at the upper part 212b of the upper component 212, in the fuel tank 2 shown in FIG. 3. The inflow part 210d is formed into a based cup shape inside the guide part 210c. The open hole 210e of the guide part 210c is located upper than the upper opening 210f of the inflow part 210d. The exit 233b of the diffuser passage 233a of the throat part 233 communicates with a portion of the inflow part 210d lower than the upper opening 210f.

The fuel pumped by the jet pump 23 flows into the inflow part 210d from the exit 233b of the diffuser passage 233a. As a result, when the inside of the inflow part 210d is filled by the fuel, the fuel will overflow into the guide part 210c from the upper opening 210f of the inflow part 210d. The fuel overflowing in this way is guided by the guide part 210c to the inner space 210a of the subtank 210.

As shown in FIG. 11, the fuel pump 22 has the discharge pore 22c, to discharge vapor fuel that is drawn in during the operation. The discharge pore 22c is located lower than the open hole 210e of the guide part 210c, and lower than the upper opening 210f of the inflow part 210d.

(Action and Effect)

The action and effect of the embodiment is explained below.

According to this embodiment, the fuel pump 22 is located offset toward the connecting strut 30 than the width center Cw of the width W of the unit body 21 in the specific transverse direction. The width W is defined from the thrust support part St in which the thrust support is carried out by the connecting strut 30 to the end of the unit body 21 opposite from the connecting strut 30. Therefore, the center of gravity Cp of the fuel pump 22, where a force of inertia is applied when the vehicle turns, accelerates or decelerates, can be made close to the thrust support part St, as shown in FIG. 6. Therefore, a moment can be restricted from increasing, even if the force of inertia becomes large at the center of gravity Cp of the fuel pump 22 to which a force is applied when the thrust support part St works as a fulcrum. Thus, it becomes possible to restrict a breakage at the radial support part Sr of FIG. 6 where the unit body 21 is radially supported by the connecting strut 30, since a moment can be restricted from increasing, as a point of load.

According to this embodiment, the surface detection unit 24 is arranged in the remaining space 21b which remains around the fuel pump 22, on the side opposite from the connecting strut 30 than the width center Cw of the width W of the unit body 21 in the specific transverse direction. Accordingly, the remaining space 21b produced in the unit body 21 can be used effectively for detecting the surface height in the fuel tank 2, since the fuel pump 22 is offset toward the connecting strut 30 than the width center Cw of the width W of the unit body 21 in the specific transverse direction. Therefore, it becomes possible to restrict breakage at the radial support part Sr while the pump unit 20 has multi-function within a limited space especially within the storage part 7 in the fuel tank 2.

Furthermore, the fuel to be drawn to the fuel pump 22 from the fuel tank 2 is stored by the inner space 210a of the subtank 210 in the unit body 21 of this embodiment. Even if an imbalance of fuel arises in the fuel tank 2 when the vehicle turns, accelerates or decelerates, the fuel to be drawn by the fuel pump 22 can be continuously secured in the inner space 210a of the subtank 210. Therefore, it becomes possible to keep better discharge performance of the fuel pump 22 by restricting intake of air from the fuel tank 2.

Furthermore, the subtank 210 of this embodiment has the enlarging part 210b projected in the remaining space 21a which remains around the fuel pump 22 on the side opposite from the connecting strut 30 through the width center Cw of the width W of the unit body 21 in the specific transverse direction. Accordingly, the remaining space 21a produced in the unit body 21 can be used effectively to increase the inner space 210a required for storing fuel, since the fuel pump 22 is offset toward the connecting strut 30 than the width center Cw of the width W of the unit body in the specific transverse direction. Therefore, it becomes possible to restrict a lowering in the discharge performance and a breakage at the radial support part Sr even in the limited space especially within the storage part 7 in the fuel tank 2.

According to this embodiment, the jet pump 23 is arranged in the remaining space 21c which remains around the fuel pump 22, on the side opposite from the connecting strut 30 through the width center Cw of the width W of the unit body 21 in the specific transverse direction. Accordingly, the remaining space 21c produced in the unit body 21 can be used effectively for pumping fuel into the subtank 210 using the diffuser passage 233a, since the fuel pump 22 is offset toward the connecting strut 30 than the width center Cw of the width W of the unit body in the specific transverse direction. Therefore, it becomes possible to restrict a lowering in the discharge performance and a breakage at the radial support part Sr even in the limited space especially within the storage part 7 in the fuel tank 2.

According to this embodiment, during the operation of the fuel pump 22, fuel pumped by the jet pump 23 flows into the based cup-shaped inflow part 210d of the subtank 210 from the exit 233b of the diffuser passage 233a. As a result, the fuel overflowing from the upper opening 210f of the inflow part 210d is guided by the guide part 210c to the inner space 210a of the subtank 210. Accordingly, even if the fuel in the inflow part 210d flows adversely to the exit 233b of the diffuser passage 233a by stopping the operation of the fuel pump 22, fuel can remain in the guide part 210c lower than the upper opening 210f of the inflow part 210d. At this time, fuel can remain at the position lower than the upper opening 210f, even in the fuel tank 2 in which the open hole 210e of the guide part 210c is open at the position upper than the upper opening 210f of the inflow part 210d.

The discharge pore 22c of the fuel pump 22 of this embodiment which discharges vapor fuel during the operation is located lower than the upper opening 210f of the inflow part 210d. Thereby, even when the operation of the fuel pump 22 is halted, the state where the discharge pore 22c is immersed in the remaining fuel in the fuel tank 2 can be maintained. Therefore, it becomes possible to restrict a lowering in the discharge performance of the fuel pump 22 at the next operation time, since air in the fuel tank 2 flows adversely to the discharge pore 22c when the operation of the fuel pump 22 is halted.

According to this embodiment, the center line Lo of the outer diameter of the fuel pump 22 is parallel to the bottom wall 2c of the fuel tank 2 on the side adjacent to the connecting strut 30 than the width center Cw of the width W of the unit body 21 in the specific transverse direction. At this time, the center of gravity Cp of the fuel pump 22 can be made close to the thrust support part St as a fulcrum not only in the transverse direction but also in the up-down direction which is the height direction from the bottom wall 2c. Even if the force of inertia becomes large at the center of gravity Cp of the fuel pump 22 as a point of effort, a ratio of restricting increase in a moment can be improved at the radial support part Sr as a point of load. Therefore, it becomes possible to improve the reliability of the effect restricting a breakage at the radial support part Sr.

Furthermore, according to this embodiment, the center line Li of the inner diameter of the throat part 233 of the jet pump 23 is parallel with the bottom wall 2c of the fuel tank 2 and the center line Lo of the outer diameter of the fuel pump 22, on the side opposite from the connecting strut 30 than the width center Cw of the width W of the unit body 21 in the specific transverse direction. Accordingly, the remaining space 21c produced in the unit body 21 can be used effectively for forming the diffuser passage 233a with a length required for pumping fuel, since the fuel pump 22 is offset toward the connecting strut 30 than the width center Cw of the width W of the unit body in the specific transverse direction. Therefore, it becomes possible to restrict a lowering in the discharge performance and a breakage at the radial support part Sr even in the limited space within the storage part 7 in the fuel tank 2.

Other Embodiment

The present disclosure can be applied to various embodiments within a range not deviated from the scope of the present disclosure, without being limited to the above-described embodiment.

Specifically, as a first modification, the surface detection unit 24 may be arranged offset toward the connecting strut 30 than the width center Cw in the width W of the unit body 21 in the specific transverse direction. As a second modification, the surface detection unit 24 may not be provided.

As a third modification, the unit body 21 may be housed in a subtank substantially separated from the unit body 21 to store fuel to be drawn by the fuel pump 22 from the fuel tank 2. As a fourth modification, the enlarging part 210b may be arranged offset toward the connecting strut 30 than the width center Cw in the width W of the unit body 21 in the specific transverse direction. As a fifth modification, the enlarging part 210b may not be provided.

As a sixth modification, the jet pump 23 may be arranged offset toward the connecting strut 30 than the width center Cw in the width W of the unit body 21 in the specific transverse direction. As a seventh modification, the discharge pore 22c of the fuel pump 22 may be located upper than the upper opening 210f of the inflow part 210d. As an eighth modification, the exit 233b of the diffuser passage 233a may be directly communicated with the guide part 210c, without forming the inflow part 210d. The jet pump 23 may not be provided as a ninth modification.

Figure 12:
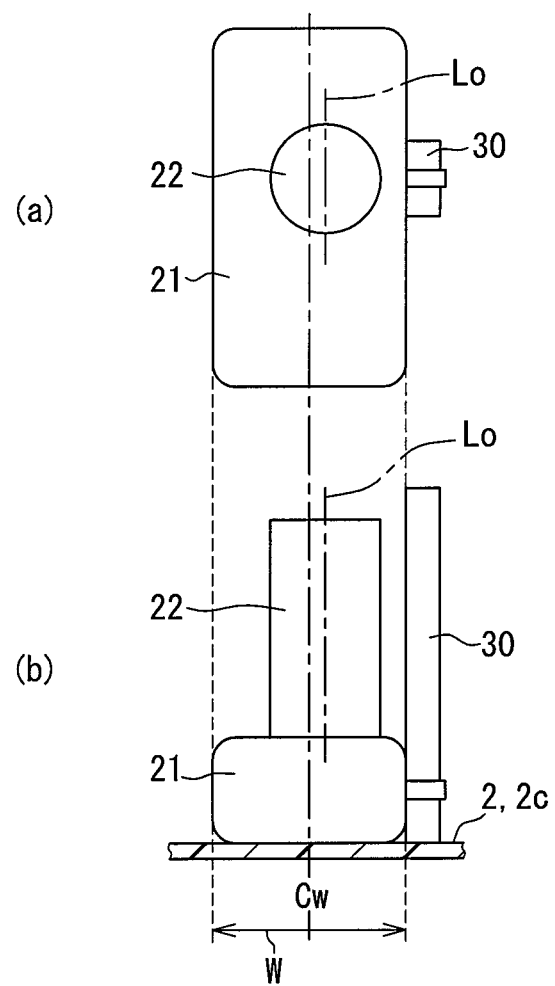
FIG. 12 is a schematic view illustrating a modification of the embodiment.
Figure 13:
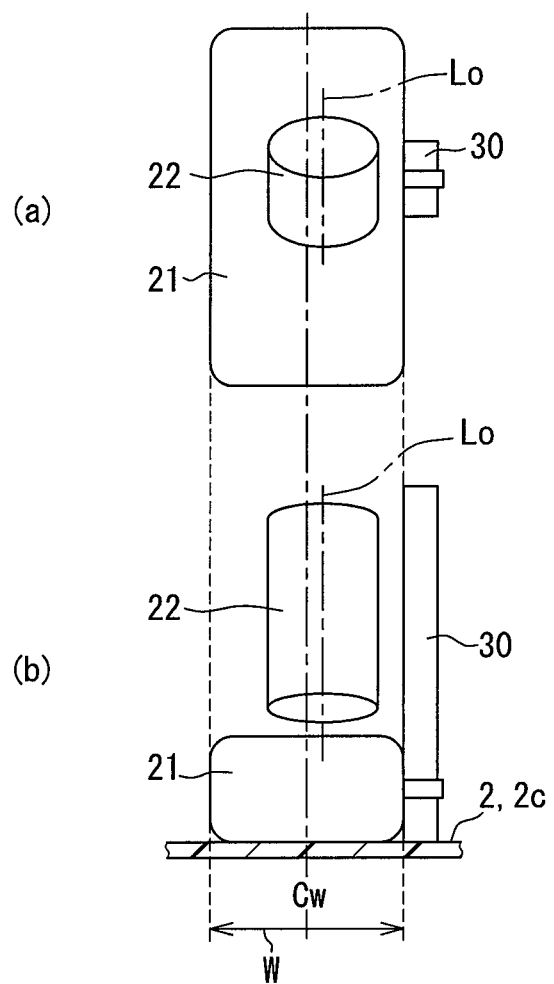
FIG. 13 is a schematic view illustrating a modification of the embodiment.

As a tenth modification, the center line Lo of the outer diameter of the fuel pump 22 may intersect the bottom wall 2c of the fuel tank 2 by approximately a right angle, as shown in FIG. 12, or by an obtuse angle, as shown in FIG. 13, when seen from one side, on the side offset toward the connecting strut 30 from the width center Cw in the width W of the unit body 21 in the specific transverse direction. Similarly, as an eleventh modification, the center line Li of the inner diameter of the throat part 233 may intersect the bottom wall 2c of the fuel tank 2 by approximately a right angle, or by an obtuse angle, when seen from one side, on the side opposite from the connecting strut 30 through the width center Cw in the width W of the unit body 21 in the specific transverse direction.

The invention claimed is:

1. A fuel supply device that supplies fuel to an internal-combustion engine from a fuel tank for a vehicle, the fuel supply device comprising:
    a cover to be attached to an upper wall of the fuel tank;
    a pump unit to be disposed on a bottom wall of the fuel tank to pump fuel from the fuel tank toward the internal-combustion engine; and
    a connecting strut that connects the cover and the pump unit with each other,
    the pump unit includes
    a unit body supported by the connecting strut in a radial direction and a thrust direction, and
    a fuel pump arranged on the unit body to pump fuel drawn from the fuel tank toward the internal-combustion engine, the center of gravity of the fuel pump being located offset toward the connecting strut than a width center of a width of the unit body, the width being defined from a thrust support part where the unit body is supported by the connecting strut to an end part of the unit body opposite from the connecting strut in a specific transverse direction, wherein:
    a subtank is provided on the unit body, and has an inner space to store fuel to be drawn by the fuel pump from the fuel tank,
    the subtank has an enlarging part that enlarges the inner space, and
    the enlarging part is projected in a remaining space that remains around the fuel pump, on a side opposite from the connecting strut through the width center of the width of the unit body in the specific transverse direction.

2. The fuel supply device according to claim 1, wherein
    the pump unit further has a surface detection unit that detects a height of fuel surface in the fuel tank, and
    the surface detection unit is arranged in a remaining space that remains around the fuel pump, on a side opposite from the connecting strut through the width center of the width of the unit body in the specific transverse direction.

3. The fuel supply device according to claim 1, wherein
    the pump unit further has a jet pump that pumps fuel from the fuel tank to the inner space through a diffuser passage in which a pressurization fuel is ejected with operation of the fuel pump, and
    the jet pump is arranged in the remaining space that remains around the fuel pump, on a side opposite from the connecting strut through the width center of the width of the unit body in the specific transverse direction.

4. The fuel supply device according to claim 3, wherein
    the subtank has an inflow part into which the fuel pumped by the jet pump flows from an exit of the diffuser passage, and a guide part that guides fuel overflowing from an upper opening of the inflow part to the inner space, the inflow part being shaped in a based cup,
    the guide part forms an open hole open to the fuel tank at a position upper than the upper opening, and
    the fuel pump has a discharge pore for discharging vapor fuel drawn during operation at a position lower than the upper opening.

5. The fuel supply device according to claim 3, wherein
    the jet pump has a throat part that forms the diffuser passage,
    a center line of an outer diameter of the fuel pump is along the bottom wall, and offset toward the connecting strut from the width center of the width of the unit body in the specific transverse direction, and
    a center line of an inner diameter of the throat part is along the bottom wall and the center line of the outer diameter of the fuel pump, and is located on a side opposite from the connecting strut through the width center of the width of the unit body in the specific transverse direction.

6. The fuel supply device according to claim 1, wherein
    a center line of an outer diameter of the fuel pump is along the bottom wall, and offset toward the connecting strut from the width center of the width of the unit body in the specific transverse direction.

* * * * *